United States Patent [19]
Runyan et al.

[11] Patent Number: 5,543,922
[45] Date of Patent: Aug. 6, 1996

[54] METHOD AND APPARATUS FOR ON-PRESS COLOR MEASUREMENT

[75] Inventors: Steven Runyan, Los Altos Hills, Calif.; James R. Cox, Richardson, Tex.; Mark R. Blais, Milpitas; Donald A. Longerbeam, Fremont, both of Calif.

[73] Assignee: Graphics Microsystems, Inc., Sunnyvale, Calif.

[21] Appl. No.: 325,052

[22] Filed: Oct. 19, 1994

[51] Int. Cl.$^6$ ...................................................... G01J 3/50
[52] U.S. Cl. ........................ 356/402; 356/375; 356/416; 356/401
[58] Field of Search ..................................... 356/402, 406, 356/407, 416, 419, 421, 422, 425, 475, 401; 250/262

[56] References Cited

U.S. PATENT DOCUMENTS

| | | | |
|---|---|---|---|
| 3,832,070 | 8/1974 | Cox | 356/421 |
| 3,970,394 | 7/1976 | Stanton | 356/425 |
| 4,657,399 | 4/1987 | Hall | 356/421 |

*Primary Examiner*—F. L. Evans
*Attorney, Agent, or Firm*—Limbach & Limbach L.L.P.

[57] ABSTRACT

A color measurement system includes a measurement patch utilizable on a continuous sample of color printed matter. The patch has a first predefined shape with a color reference area centrally located on the patch and a high contrast feature located proximate to an edge of the patch. A camera scans the sample and generates a location signal upon detection of the high contrast feature which permits accurate positioning of a measurement sensor.

12 Claims, 4 Drawing Sheets

1

METHOD AND APPARATUS FOR ON-PRESS COLOR MEASUREMENT

FIELD OF THE INVENTION

The present invention relates to color measurement systems, and more particularly, to a color measurement patch for use on a moving sample of color printed matter, which permits accurate location of the moving patch by a color measurement system resulting in improved measurement data even under a variety of register conditions.

BACKGROUND

Color measurement systems for web printing processes are generally known. For example, Graphics Microsystems, Inc., assignee herein, has for many years made and sold AUTOSMART densitometers for color measurement systems and MICROCOLOR ink control systems. More recently, Graphics Microsystems has used color measurement in a closed-loop color control system sold as the AUTOCOLOR color control system.

Until now, the color measurement systems used by Graphics Microsystems have required an operator to place the printed sheet or signature on a measurement system after it is removed from the printing press. It is well known that the preferred method, particularly in web press printing, is to measure color automatically on the press both to save operator time and to provide more prompt and frequent measurements for the color control system.

A number of on-press color measurement systems have been designed, including those made by MacBeth, Finnish Research Center (now the Honeywell system), IGT, and others. All have had only limited use due in large part to an inability to accurately locate a measurement patch on a moving web or sheet or because the measurement patch required was too large to be acceptable, particularly in web printing. Thus, for successful on-press, closed-loop color control, a small measurement patch is necessary, e.g. 2 mm in the running direction and 4 mm in the cross-web direction. A successful system must find the small measurement patch accurately for measurement, and then confirm that the location was accurate enough to use the measurement thus obtained.

Verification of measurements is critical for a successful color control system. Color control with measurements that are incorrect because the measurement was not made in the correct location can increase rather than reduce scrap compared to manual color control. Therefore, a successful color control system must be able to confirm the accuracy of the measurement location before using it for color control.

SUMMARY OF THE INVENTION

The present invention is a color measurement system including a patch utilizable on a continuous web of color printed matter. The patch has a first predefined shape with a color reference area located thereon and a high contrast feature located proximate to an edge of the first shape. In the preferred embodiment, the first shape is a first rectangle and the high contrast feature is a second rectangle smaller than the first rectangle and having unprinted substrate showing therethrough. Positioning means are provided adjacent to the web for traversing the web in the cross-web direction with a camera and measurement head. An encoder provides synchronization information to the positioning means related to web travel in the web-movement direction. A camera scans the web at the expected cross-web location of a patch and generates location information upon detection of the high contrast feature, which information is provided to the positioning means. A measurement sensor scans the patch web at a location determined by the positioning means.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
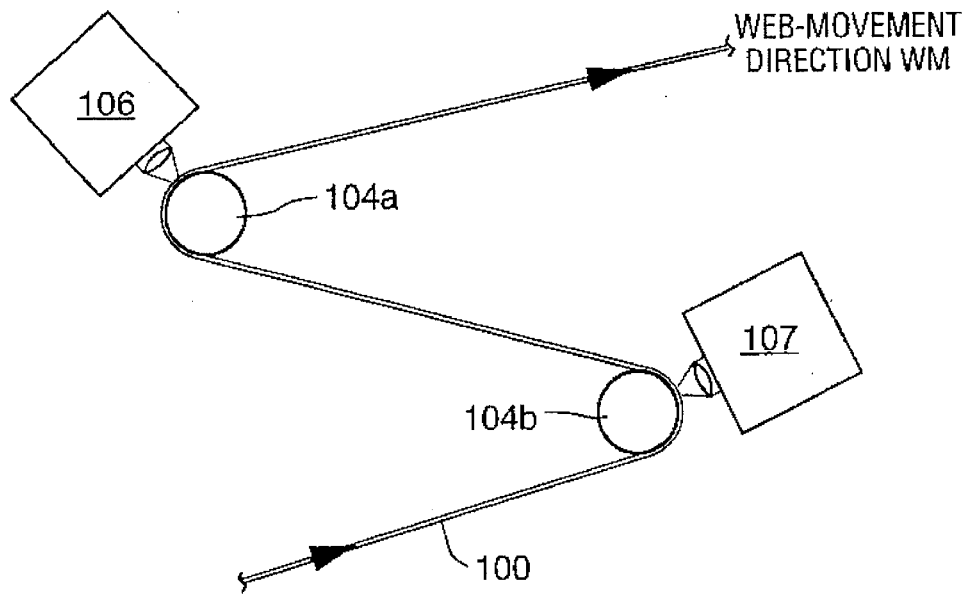
FIG. 1 is a schematic representation of the color measurement portion of an on-press web printing apparatus.

FIG. 1 illustrates the color measurement section of an on-press web printing process in which a continuous web 100 travels in the web-movement direction WM as indicated by the arrows through rollers 104. While the present invention is described with reference to a continuous web, those skilled in the art will appreciate that any type of color printed matter is contemplated wherein the printed matter is moving past a color measurement head.

The web 100 begins as an unprinted substrate which passes through an inking section (not shown) to the color measurement section. In the inking section, colored ink(s) are applied to the unprinted substrate in a conventional manner, for example via a series of ink keys arranged across the web 100 perpendicular to the web-movement direction, i.e., in the cross-web direction CW. Inks may be applied to one or both sides of the web 100 depending on the printing requirements. The inks are applied in repetitive patterns or "impressions" wherein each impression represents a single unit of the finished printed matter product. Between each impression, a color bar is provided wherein one or more ink colors are printed as a reference for a color control system. Information obtained in the color measurement portion may be used in the color control system for monitoring and reporting the print quality, and for adjusting ink keys.

A measurement unit 106 is positioned adjacent the web 100 near roller 104*a* for monitoring printed color(s) on one side of the web 100 in accordance with the program of the color control system. A second measurement unit 107 could be used to monitor printed color(s) on the other side of the web 100 if both sides are printed, and it could be positioned adjacent the web 100 near roller 104*b*. To avoid redundancy, only the structure and operation of measurement unit 106 will be described below, but it should be recognized that the description would apply equally the measurement unit 107.

Figure 2:
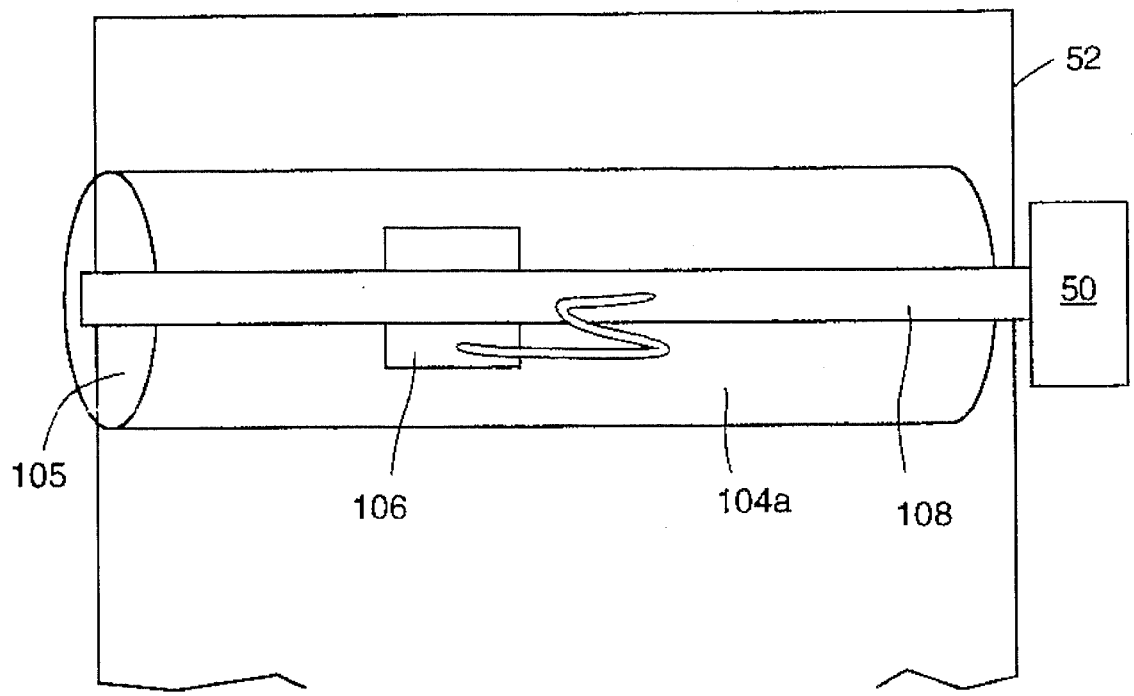
FIG. 2 is a schematic representation of a measurement unit showing mounted on a traverse mechanism to examine the web.

Referring now to FIG. 2, the measurement unit 106 is slidably attached to a motor-driven traverse mechanism 108 so that the measurement unit 106 can be driven to any point across the web 100 ("the cross-web direction CW") under the direction of an on-press control module 50.

Figure 3:
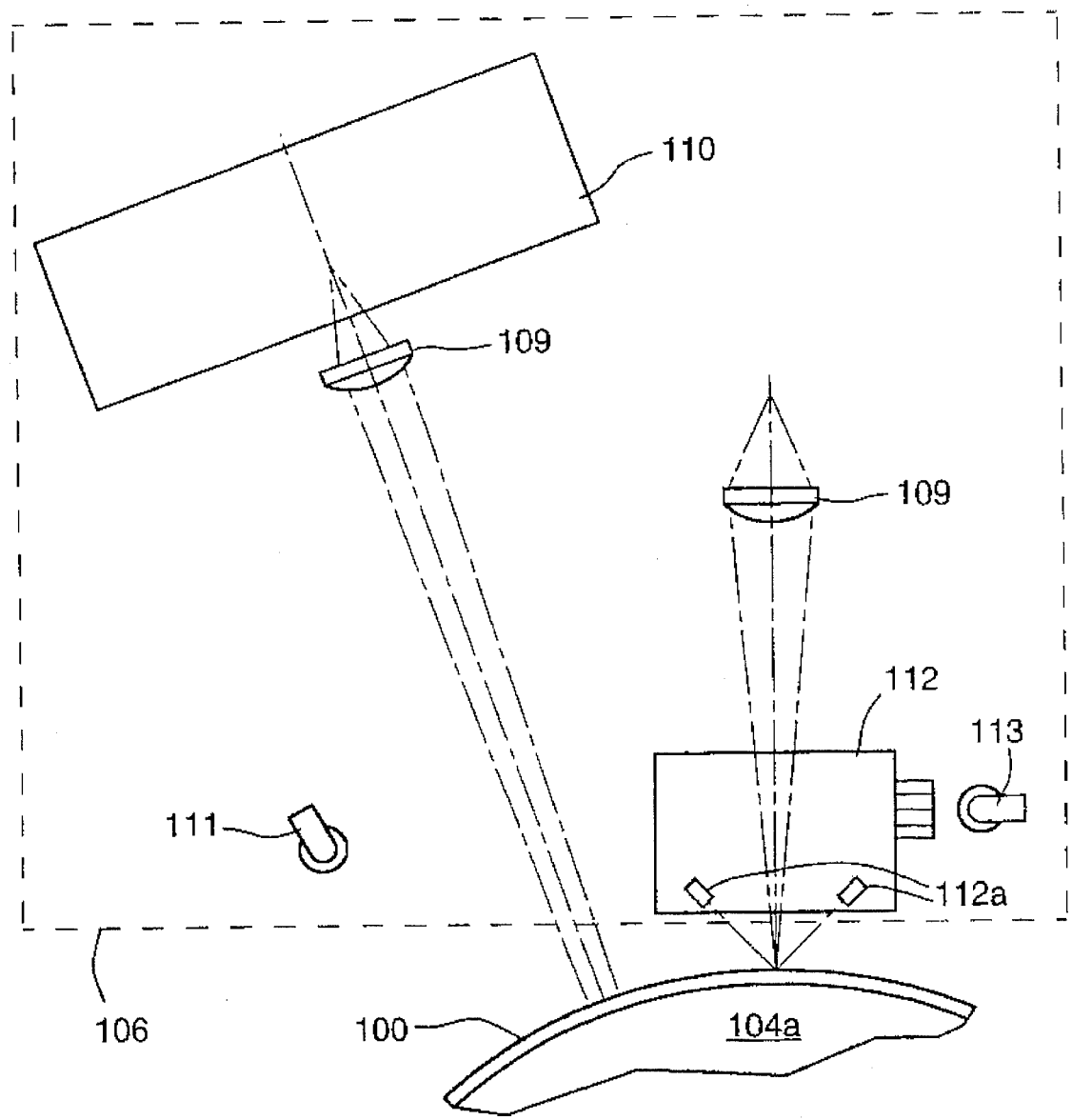
FIG. 3 is a more detailed illustration of the preferred measurement unit according to the present invention.

As shown in FIG. 3, the measurement unit 106 includes a position camera 110 and a measurement head 112 arranged in a fixed orientation relative to each other and relative to the roller 104a. Those skilled in the art will appreciate that the camera 100 and head 112 could be individually controllable, but they are commonly controlled in the preferred embodiment. The position camera 110 is preferably located a short distance ahead of the measurement head 112, for example, 25 mm on a 150 mm roller. The preferred position camera 110 is an area camera, such as the Dalsa model CA-DI-0064A, which uses a independent flash 111 to illuminate an area of the web, for example, an area 6.4 mm by 6.4 mm. The picture of the illuminated area is captured and processed, for example, by a Dipix Frame Grabber model P360F and Dell Optiplex 466 computer to provide information regarding the actual position of the patch 200 and feature 204 to the color control and positioning system.

The measurement head 112 is preferably a spectrophotometer, for example, one having a flash lamp 113, optics 112a positioned with a known geometry to illuminate the target on web 100 and to collect light which is reflected from the target, and circuit or processor means to analyze the reflected light. The preferred and well-known method for collecting and analyzing light with a spectrophotometer is the use of a spectral grating and an array of sensors with computer analysis. A well-known alternative method is by the use of filters to provide the spectral response and collecting the filtered light with individual photo sensors. Of course, other types of color measurement heads could also be used, such as a densitometer.

Figure 4:
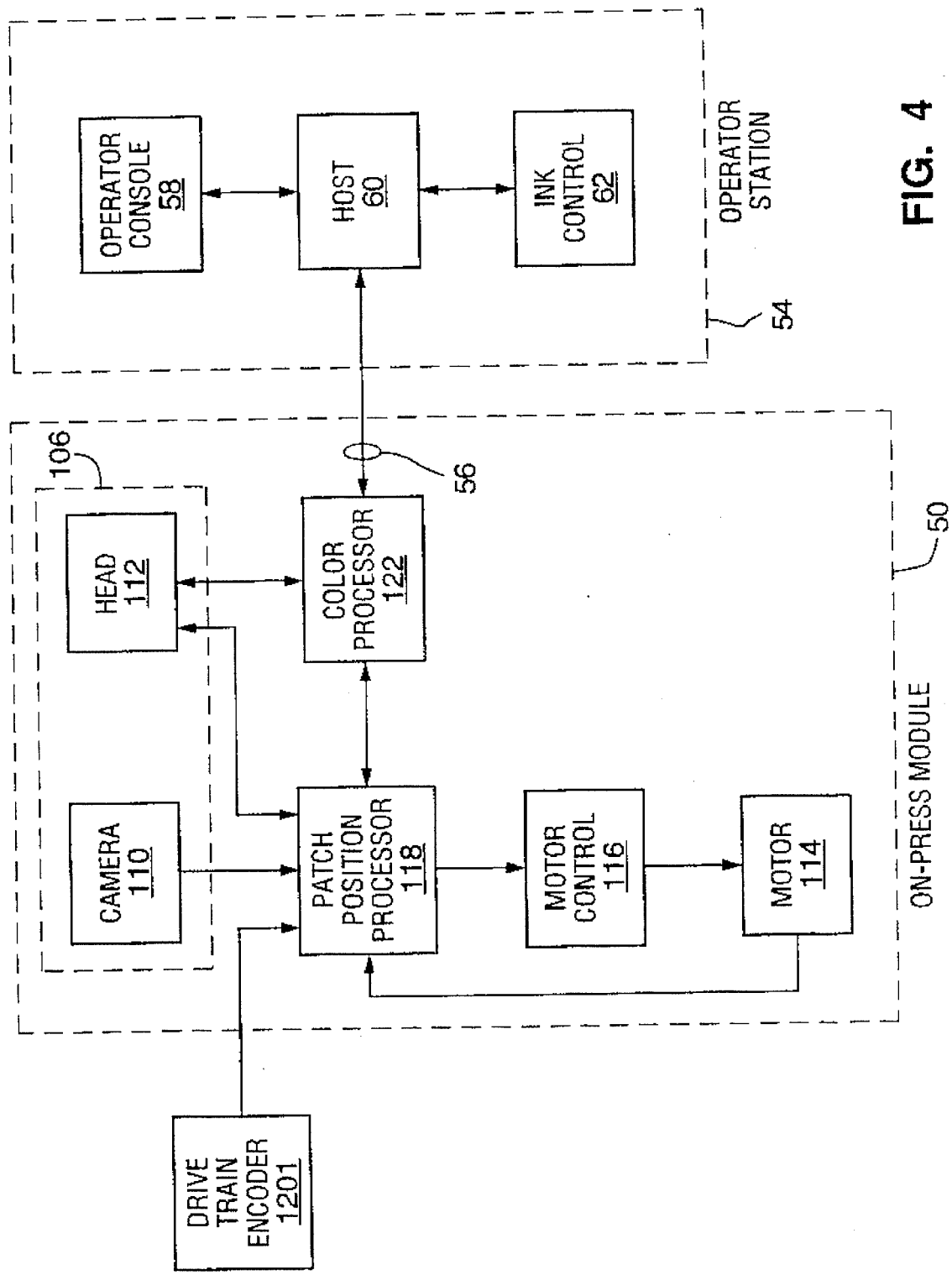
FIG. 4 is a block diagram of a color measurement system.

FIG. 4 shows a block diagram of the color control and positioning system according to the present invention. The measurement unit 106 containing camera 110 and measurement head 112 is positioned in the cross-web direction CW by motor 114. The motor 114 is driven by motor control circuit 116 as directed by patch position processor 118. The patch position processor 118 obtains location information for its position control scheme from camera 110 and receives synchronization information from a drive train encoder 120 which delivers synchronization signals from the main print cylinder (not shown). For example, the encoder produces a first signal in the form of a pulse once each impression plus a second signal in the form of a multiplicity of pulses directly related to the circumferential position of the web plate cylinder (not shown). Thus, the field traversed by the camera 110 is advantageously limited based on such information. It can be appreciated by those skilled in the art that the position control scheme can be readily implemented with software in a microprocessor, and many solutions are available.

The measurement head 112 obtains color information from the printed web and provides the data to a color processor 122. The color processor 122 and the patch position processor 118 could be the same computer or could share computer resources. In a particularly preferred embodiment of the present invention, the position information generated by the patch position processor 118 is used in conjunction with the color information generated by the color processor 122 to provide a validation of the color quality based on the accuracy of the measurement position.

Task description information, such as color bar layout, measurements to be made, and the frequency of measurement, are sent to the on-press module 50 from an operator station 54 via a communications link 56. Color measurement and position information are sent back from the on-press module 50 to the operator station 54 via the communications link 56.

The operator station 54 includes adequate hardware to report results to the operator on a operator console 58, store data for quality assurance and management reports in host computer 60, and to control color via ink control console 62.

Figure 5:
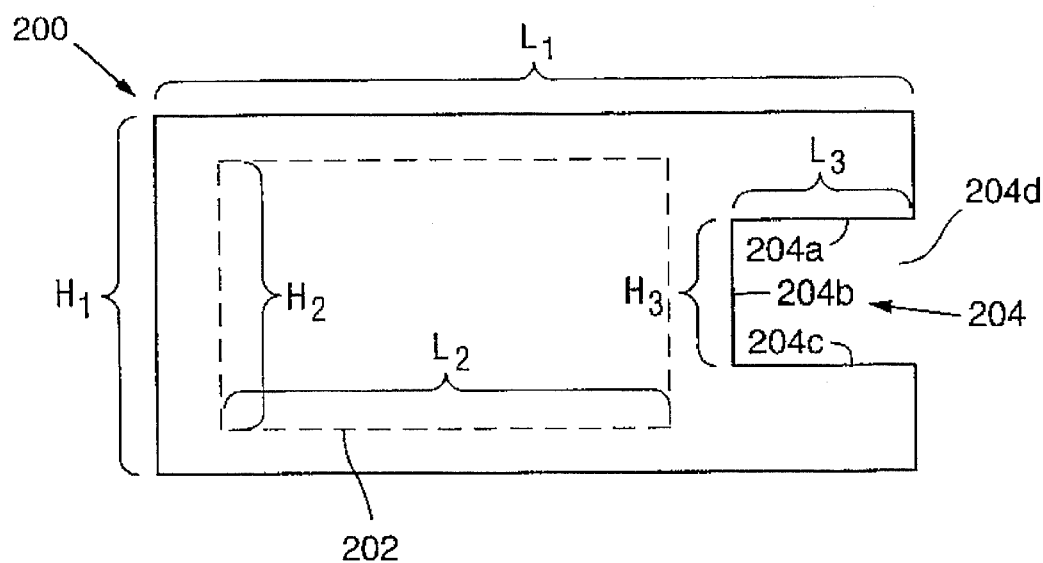
FIG. 5 is a plan view of a color measurement patch in accordance with the preferred embodiment of the present invention.

In accord with the present invention, a plurality of measurement patches are printed between impressions to form a color bar. The preferred embodiment of the measurement patch 200 is shown in FIG. 5. The measurement patch 200 described is suitable for use in a 2 mm color bar on a web of printed material (not shown), but those skilled in the art will appreciated that certain variations in the printed matter, its color reference area and the color bar layout may be made without departing from the scope of the invention.

The measurement patch 200 is preferably a rectangular portion measuring 4.2 mm in length $L_1$ by 2 mm in height $H_1$. A target measurement area 202 is located centrally on the patch as indicated by the dashed outline and measures 2.5 mm in length $L_2$ by 1.5 mm in height $H_2$. The dashed outline defining the target measurement area 202 is not part of the patch 200, but is added merely to facilitate this description. It is preferred and desirable to make color measurements within the target measurement area, and the measurement target will frequently be the center of the patch. The patch 200 generally includes one or more reference colors for utilization by the color measurement and control system, as described more fully below.

Figure 6:
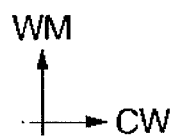
FIG. 6 is a plan view showing an overlap of several adjacent color measurement patches.
Figure 6:
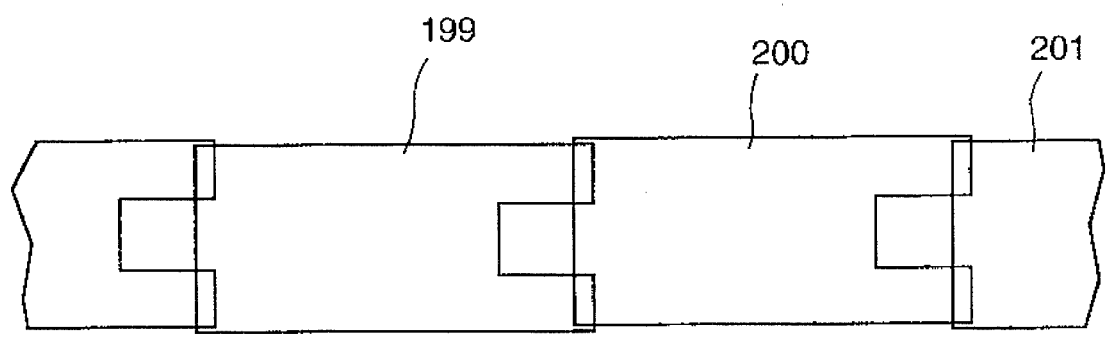

A high-contrast, readily identifiable feature 204 is located at one edge of the patch 200. In this embodiment, the feature 204 is a simple rectangular unprinted area measuring approximately 1.0 mm in length $L_3$ by 0.8 mm in height $H_3$. The feature 204 has edges 204a, 204b and 204c which are readily identifiable in the image captured and digitized by the camera 110 and processor 118. Thus, the feature 204 can be positioned and sized to permit the largest possible measurement area 202 and at the same time be locatable under the widest possible conditions of misregister. These objectives are met by providing a rectangular unprinted area, as shown. However, those skilled in the art will appreciate that other embodiments are possible. For example, it may be desirable in an overprint area to have the feature 204 defined by only one ink for measurement of trap. Otherwise, misregistration can affect detection of the 3 edges 204a, 204b and 204c. The length $L_1$ of the patch 200 can be shortened by approximately the length $L_3$ of the feature 204. The most important requirement is that the patch have a high contrast, readily identifiable feature 204 located on or near the edge of the patch and approximately centrally located in the web-movement direction WM of the patch. The feature 204 must not, of course, interfere with the measurement area 202 of the patch 200 or that of an adjacent patches 199 and 201 (as shown in FIG. 6).

The preferred configuration of the measurement patch 200 is thus a large printed rectangle having a smaller unprinted rectangle carved out of the larger rectangle. The smaller unprinted rectangle will typically have three sides 240a, 204b and 204c defined by the patch itself, and the fourth side 204d defined by another patch. However, the fourth side 204d may sometimes be open, for example, if there is no patch next to it, or in cases where misregister causes underlap rather than overlap of an adjacent patch.

The height $H_3$ of the unprinted rectangle 14 will not change with misregister and therefore it provides a good basis for locating the center of the measurement area 12 in the web travel direction Y under a wide variety of register conditions.

The location of the edge 204b of the unprinted rectangle 204 with respect to the measurement area 202 does not change with misregister and therefore provides a convenient reference feature to locate the center of the measurement area 202 in the cross-web direction CW under a wide variety of misregister conditions. The edges 204a and 204c provide a quick and easy reference for determining the center of the measurement area 202 in the web-movement direction WM as well. Thus, in a preferred control scheme, the location of the edges 204a, 204b and 204c are used in a first processing step to quickly locate the target measurement point and then used in a second processing step to evaluate the accuracy of that location and thereby provide a measure of the quality of the measurement which was taken at that location.

As previously described, the measurement patch 200 is typically located in a color bar containing a number of similar measurement patches 199, 201, etc. In the preferred embodiment, the patches 199, 200, 201, etc., are on 4 mm centers in the cross-web direction CW to form a color bar measuring 2 mm in the web-movement direction WM, thereby overlapping each other by some small amount when in the nominal position, for example 0.2 mm.

There may also be other unknown printed matter, not shown, adjacent to the color bar in the web-movement direction WM up to the nominal position of the measurement patches. Thus, in addition to the overlap with other patches in the cross-web direction CW, there may be overlap with the unknown printed matter when measurement patches are misregistered in the web-movement direction WM. The nominal overlap of the patches in the cross-web direction CW causes the unprinted rectangle 204 to be easier to find under a variety of misregister conditions without significantly interfering with the central measurement area 202. Thus, the unique configuration of the color measurement patch 204 provides a readily identifiable feature, even under a variety of misregister conditions resulting in overlap with adjacent patches or unknown printed matter.

The ability to locate the unique feature 204 under a variety of misregister conditions also allows the patch 200 to function as an index or fiduciary mark for a register control system in addition to providing a color measurement area for ink control and color quality reporting.

As in well known, one or more fiduciary marks may be provided on or near the color bar area. Such marks are typically used to provide an initial synchronization of the color measurement and positioning system.

Initial synchronization is obtained by searching for a first fiduciary mark and storing the encoder count at which it occurred. The operator specifies the general location of the first fiduciary mark, for example, by specifying the ink key number in line with the mark. The fiduciary mark is typically a printed bar of the same height as the color bar with a minimum of 5 mm white space before and 2 mm after the bar. Locating the mark requires a continuous search in the web-movement direction WM while moving the head in the cross-web direction CW to span the expected range of locations for the mark based on the operator specification of the general location such as the ink key number in line with the mark. If false marks are expected, the first mark can be verified by providing a nearby second fiduciary mark in the color bar. If the second fiduciary mark is not found, the first fiduciary mark found would be flagged as invalid and the search would continue for another mark until one is found and confirmed by the second mark.

The fiduciary marks are preferably detected by camera 110, but an additional sensor may be used. Camera and camera illumination could be an area scan camera with a flash lamp or a line scan camera with a continuous light source.

Once initial synchronization is confirmed, the encoder count for future alignment flashes and the cross-web position for other patches will be adjusted for each impression by the optical alignment system based on image analysis from the previous impression.

The preferred color measurement and positioning system takes measurements in the color bars between impressions according to a predetermined pattern as the continuous web travels past the measuring unit 106. For example, the measuring unit 106 may be driven to an expected alignment position in the cross-web direction CW corresponding to the first patch 199. When the web 100 has traveled to an expected alignment position in the web-movement direction WM, as determined by encoder information, the alignment (camera) flash is made. The patch position processor 118 compares the actual alignment position, i.e., the center point of the camera array with respect to the image of the patch, to the expected alignment position and calculates, based on encoder information and the fact that measurement head 112 is located a known distance behind the camera 110 in the web movement direction WM, the moment when the measurement flash should be triggered. If a slight adjustment is necessary in the cross-web direction CW, it can be made based on the actual alignment position before the measurement flash is triggered. The actual position combined with the known relative positions of the patches in the color bar is then used to calculate the expected position for the next patch 200 to be measured, and the process is repeated. The determination of actual position is made by finding, in the digitized camera image, the edges of the feature 204, as previously described. Since the center of the measurement head aperture is known relative to the center point of the camera array, once the actual alignment position is determined, the actual measurement position may also be determined with greater accuracy.

Variations in the impression-to-impression alignment target position determine the required field of search for the measurement unit 106. The search is based on the expected location of an adjacent or almost-adjacent patch in the previous impression combined with the drive shaft encoder count. There may be variations in the web-movement direction WM due to causes such as substrate stretch and encoder variations. Variations in the cross-web direction CW may be due to causes such as web weave and web shrinkage.

There are many advantages to the preferred arrangement. Since alignment information is provided on the patch to be measured, and since the alignment information is so close to the measurement position, the variations in location are due almost entirely to those of the image capture and processing equipment. Also, having a separate positioning camera and measurement head allows the systems to be optimized for both alignment and measurement.

An alternative arrangement employs a line scan camera and a continuous light source. For example, a Dalsa camera model CL-C3-0128A may be used with a Dipix Frame Grabber model P360DF, a circuit for supplying the line rate pulse, and a computer, for image capture and processing. The light source could be a tungsten-halogen lamp, which costs less than a xenon flash lamp.

In yet another arrangement, the area camera 110 uses the same flash as the measurement head 112. The measurement optics and the camera optics are viewing the same measurement patch at the same time. Illumination is by a single flash. Since the flash is determined only by the encoder and location information from the previous impression, the flash timing will include some impression-to-impression variations that are not included when the camera is just ahead of the measurement location. However, if the flash is inaccurate, that will be known and the measurement can be discarded. In this arrangement, the camera could be the Dalsa model CA-DI-0064A, and image capture and processing hardware could be the Dipix Frame Grabber model P360DF and computer. This embodiment has the advantage of requiring only one flash lamp and power supply for both measurement and alignment.

For across web positioning in all embodiments, the difference between the actual position of the patch being measured and the expected position will be fed back to the across-web positioning mechanism as an error signal to adjust the expected target position for the next patch to be measured.

Thus, it can be seen that the present invention provides a novel color measurement patch that provides a high contrast, readily identifiable feature even with unknown printed matter (for example, bleed) on one or both sides of the patch in the web travel direction and with varying amounts of misregister of the colors. The patch also enables easy and accurate location of the center of the measurement area of the patch under these conditions, which allows, advantageously, its use as a color register mark to verify register or in a system to control color register. Further, the patch also effectively provides a method for verifying after a measurement whether the location of the measurement on the measurement patch was accurate enough to be valid.

It should be understood that the invention is not intended to be limited by the specifics of the above-described embodiment, but rather defined by the accompanying claims.

We claim:

1. In a color measurement system wherein a printed substrate is driven past a measurement head, the printed substrate including a color bar having a plurality of color measurement patches arranged across the printed substrate, each of the color measurement patches having a color reference area centrally located thereon, the improvement comprising, each color measurement patch including a first predefined shape having the color reference area therein and a high contrast feature located proximate to an edge of the first shape.

2. A color measurement system as in claim 1, wherein the high contrast feature comprises an unprinted area.

3. A color measurement system as in claim 1, wherein the high contrast feature comprises an area printed with a single ink.

4. A color measurement system as in claim 1, wherein the high contrast feature is a second predefined shape smaller than the first predefined shape and not encroaching on the color reference area.

5. A color measurement system as in claim 1, wherein the first predefined shape is a first rectangle.

6. A color measurement system as in claim 5, wherein the high contrast feature is a second rectangle smaller than the first rectangle and not encroaching on the color reference area.

7. A color measurement system as in claim 6, wherein the second rectangle has one side thereof coincident with the edge of the first rectangle and the other three sides inside the first rectangle.

8. A system for measuring color on a moving sample of printed matter, said sample moving through the system in a sample-movement direction and having a cross-sample dimension which is perpendicular to the sample-movement direction, comprising:

a plurality of measurement patches arranged to form a color bar in the cross-sample direction on the sample, each of said patches having a first predefined shape with a color reference area located thereon and a high contrast feature located proximate to an edge of the first shape;

positioning means adjacent to the sample for traversing the sample in the cross-sample direction;

camera means coupled to the positioning means for scanning the sample at a location determined by the positioning means and for generating location information regarding each patch and its high contrast feature; and measurement means coupled to the positioning means for illuminating and scanning the sample at a location determined by the positioning means.

9. A system as in claim 8, wherein the camera means further comprises means for illuminating the sample.

10. A system as in claim 8, further comprising processor means for determining an expected location of a system, for comparing the actual location of the patch to the expected location of the patch based on the location information, and for controlling the positioning means in response therewith.

11. A method for measuring colors on a moving sample of color printed matter, comprising:

providing a plurality of color measurement patches in a known arrangement on the sample, each of said patches having a first predefined shape with a color reference area located thereon and a high contrast feature located proximate to an edge of the first shape;

positioning a camera and a measurement head adjacent to the sample in an expected location for a selected patch;

capturing an image of the selected patch with the camera and generating actual location information therefrom;

measuring color at a measurement target position on the color reference area of the selected patch with the measurement head; and repositioning the camera and measurement head in response to the actual information generated.

12. A system for measuring color on a printed substrate, comprising:

a plurality of measurement patches arranged across the substrate, each of said patches having a first predefined shape having a color reference area located thereon and a high contrast feature located proximate to an edge of the first shape;

means for illuminating the substrate at a selected location;

means for capturing an image of the illuminated substrate; and means for generating location information from the captured image of the illuminated substrate.

* * * * *